April 9, 1963     F. W. FORK     3,084,480
ELECTRICAL TRENCH
Filed June 27, 1961
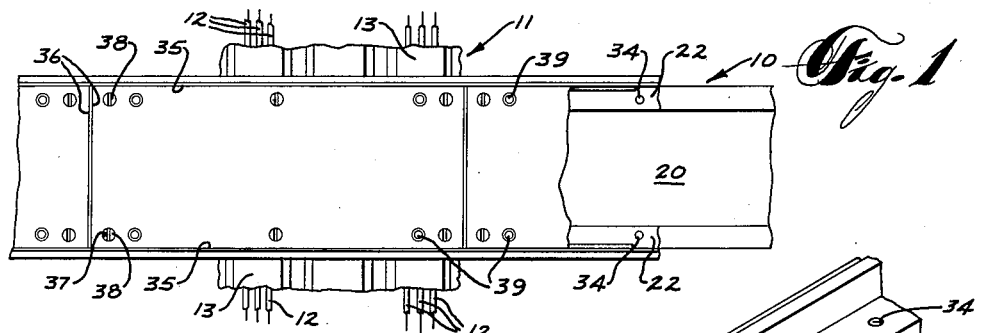
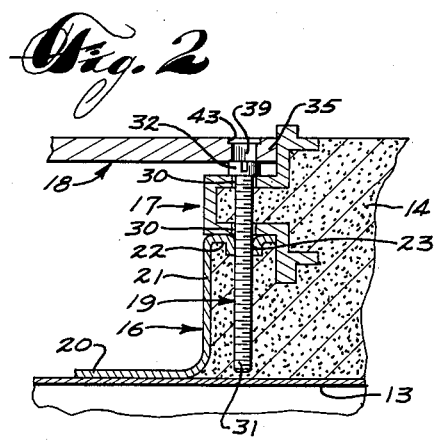
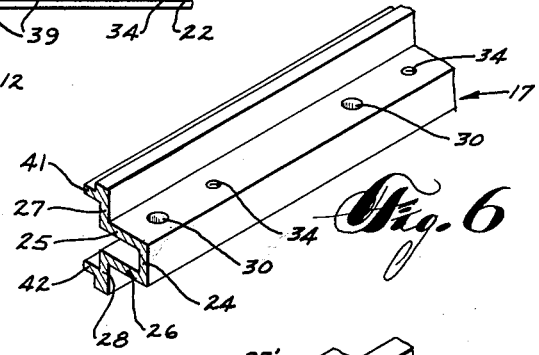
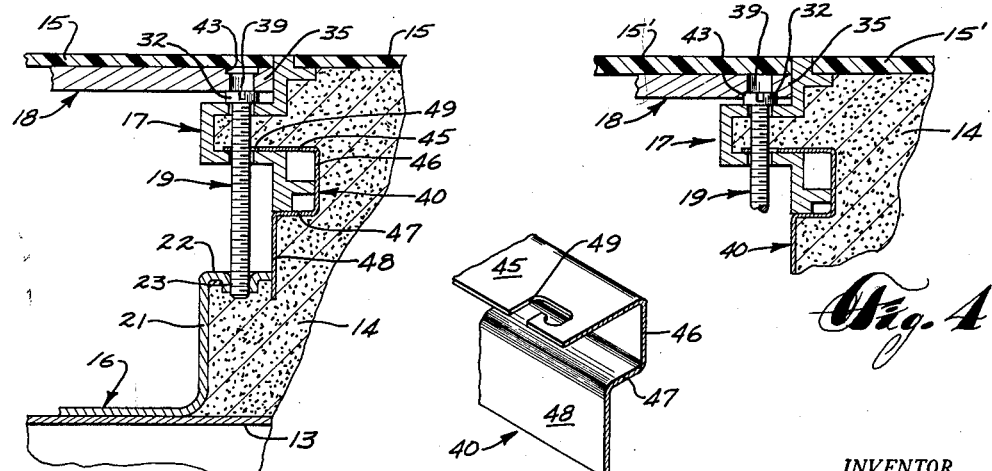
INVENTOR.
FRANK W. FORK
BY
*Harry B. Keck*
ATTORNEY United States Patent Office 3,084,480
Patented Apr. 9, 1963

3,084,480
ELECTRICAL TRENCH
Frank W. Fork, Pittsburgh, Pa., assignor to H. H. Robertson Company, Pittsburgh, Pa., a corporation of Pennsylvania
Filed June 27, 1961, Ser. No. 119,864
7 Claims. (Cl. 50—126)

This invention relates to an electrical trench assembly. More particularly, this invention relates to an electrical trench which can be utilized in conjunction with metal cellular flooring for building construction as well as in conjunction with underfloor electrical distribution facilities associated with reinforced concrete flooring buildings.

The provision of underfloor electrical raceways in modern buildings has become standard construction. The use of metal cellular floor for this purpose is well known in the art. See U.S. Patent 2,445,197. Provision of trenches and raceways in poured concrete flooring similarly is well known in the art. As the electrical usage in modern buildings has increased, the need for greater electrical carrying capacity has become apparent. Similarly the changeable character of a building's usage emphasizes the need for increased accessibility to electrical carrying channels to accommodate frequent alterations in the electrical utilization.

Assording to a preferred embodiment of this invention, a readily accessible electrical trench is provided for use in cooperation with metal cellular flooring.

The development of reinforced concrete flooring which does not employ metal cellular flooring as a support has generated a need for electrical wire carrying trenches within such flooring. The present electrical trench can be installed in reinforced concrete flooring where cooperation is not required with metal cellular flooring.

The present electrical trench is convenient to assemble and provides convenient access for maintenance and adjustment throughout the life of a building in which it is installed. The present electrical trench can be used in co-operation with metal cellular flooring and also can be used independently in poured reinforced concrete flooring. The present electrical trench has a unique vertical adjustability and screed leveling feature. A rugged construction characterizes the present electrical trench. The component elements of the present electrical trench can be adapted to accommodate trenches of varying size and various floor thicknesses. The present electrical trench, in addition, can be leveled entirely from above through leveling means. The present electrical trench may be factory-assembled for immediate installation in a building site.

One problem which has always proved troublesome to building constructors is the inherent variation in concrete thickness which appears in poured concrete flooring. That is, the concrete fill is thicker between supporting beams than in regions overlying supporting beams. The weight of the unsupported concrete in the spans between supporting beams creates an inherent sag and a corresponding increased concrete thickness. Horizontal surface alignment of trench elements has been difficult to accomplish. Frequently the differential thickness of concrete is one inch and more. A differential thickness of at least one-half inch is commonplace.

Horizontal alignment of the present electrical trench can be readily accomplished.

An object of the present invention is to provide a versatile electrical trench comprising a unique assembly of component elements.

A further object of this invention is to provide an electrical trench which can be leveled readily without departing from an overall rugged construction.

Another object of this invention is to provide an electrical trench which can be assembled in various dimensions from common elements.

A still further object of this invention is to provide an electrical trench having an interior passageway which is readily accessible throughout the life of the building in which it is installed.

Another object of this invention is to provide an electrical trench comprised of elements which can accommodate floor finishing materials of different thicknesses.

A further object of this invention is to provide an electrical trench which may be adjusted from above for surface alignment from a factory-assembled condition.

These and other objects and advantages of the present invention will become apparent from the following detailed description by reference to the accompanying drawings in which:

FIGURE 1 is a fragmentary plan view of the present electrical trench assembled above conventional metal cellular flooring;

FIGURE 2 is a fragmentary cross-section view of the present electrical trench taken along the line 2—2 of FIGURE 1 and showing especially the leveling screws of this trench;

FIGURE 3 likewise is a fragmentary cross-section view of the present electrical trench taken along the line 2—2 of FIGURE 1 and showing the leveling screws in an elevated position and further showing cooperation of a sleeper channel;

FIGURE 4 is a fragmentary cross-section view of the present electrical trench adapted to receive a thicker floor finishing material than the floor finishing material shown in FIGURE 3;

FIGURE 5 is a fragmentary perspective illustration of the sleeper channel which can be seen in cross-section in FIGURES 2, 3 and 4;

FIGURE 6 is a perspective illustration of a fragment of a C-shaped channel utilized in the present electrical trench; and FIGURE 7 is a perspective illustration of a fragment of an alternative embodiment of the longitudinal channel corresponding to that of FIGURE 6.

The present electrical trench is designated generally by the numeral 10 in FIGURE 1 where the trench 10 is shown in a preferred environment in association with metal cellular flooring 11. The metal flooring 11 serves as conduits for electrical cables 12. The electrical trench 10 serves as a major feeding conduit for the electrical cables which pass through corresponding openings in the base of the trench and the upper surfaces 13 of the metal cellular flooring. Concrete 14 is poured above the upper surfaces 13 of the metal cellular flooring 11 to serve as a rigid floor for the resulting building. Normally a decorative coating 15 (FIGURES 3 and 4) is provided above the concrete 14, for example, linoleum, asphalt tile, rubber tile, ceramic tile and the like.

The present electrical trench comprises an essentially U-shaped channel 16, a pair of linear C-shaped channels 17, a plurality of cover plates 18, and a plurality of leveling screws 19 and fastening screws 38.

The U-shaped channel 16 has a horizontal web 20 or base which rests upon the upper surfaces 13 of the metal cellular flooring 11. Vertical leg members 21 extend from the edges of the web 20 and terminate in generally horizontal flanges 22. A plurality of spaced threaded openings 23 is provided in the horizontal flanges 22 for threadedly receiving the leveling screws 19. The U-shaped channel 16 preferably is formed from metal such as steel sheet of thickness from about 12 gauge to about 24 gauge.

The C-shaped channels 17 are illustrated in detail in FIGURE 6 and comprise a vertical web 24 or base, horizontal legs 25, 26 at the edges of the vertical web 24 and vertical outward flanges 27, 28 at the ends of the horizontal legs 25, 26 respectively. The horizontal legs 25, 26 have spaced clearance openings 30 corresponding with the threaded openings 23 of the horizontal flanges 22 of the U-shaped channel 16. The leveling screws 19 extend vertically downwardly through the clearance openings 30.

The leveling screws 19 have a threaded shaft 31 and a slotted head portion 32 of greater diameter than the shaft 31. The head portion 31 has a slot for receiving a screwdriver tip or similar screw-turning implement.

It will be observed that the horizontal leg 25 of the C-shaped channel 17 lies on the generally horizontal flange 22 of the U-shaped channel 16. It will further be observed that the C-shaped channel 17 can be turned over so that the horizontal leg 26 lies on the generally horizontal flange 22 of the U-shaped channel 16. The purpose in providing the alternative will be described hereinafter. The C-shaped channels are extruded preferably from aluminum.

The horizontal legs 25, 26 further are provided with spaced threaded openings 34.

The cover plates 18 are generally rectangular having side edges 35 and abutting edges 36. The side edges 35 are tightly fitted between the upper vertical flanges 27 of the two C-shaped channels 17 and, as shown in FIGURE 2, overlie the web 20 of the U-shaped channel 16. A plurality of screw-receiving openings 37 is provided in each cover plate 18 adjacent to the side edges 35. Fastening screws 38 extend through the openings 37 and are threadedly secured in the spaced threaded openings 34 of the C-shaped channel 17. The distances between the cover plate screw-receiving openings 37 corresponds to the spacing of the threaded openings 34 of the C-shaped channels 17. Additional access openings 39 are provided in the cover plates 18 adjacent to the side edges 35 at distances corresponding to the spacing of the clearance openings 30 of the C-shaped channels 17 (and hence, of course, corresponding to the spacing of the threaded openings 23 of the horizontal flanges 22 of the U-shaped channels 16). The cover plates 18 preferably are cut from steel plate having a thickness of approximately one-quarter inch.

The access openings 39 have a smaller cross-section diameter than the head portion 32 of the leveling screws 19. Thus the head portions 32 over their circumferential portions actually abut the undersurface of the cover plates in the region annularly disposed from the access openings 39. Thus, when the fastening screws 38 are installed, the cover plates 18 are rigidly secured with respect to the C-shaped channels 17 and rest upon the head portions 32 of the leveling screws 19 with the side edges 35 snugly fitted between the vertical flanges 27.

This assembly can be clearly seen by reference to FIGURE 2. There it will be seen that the leveling screw 19 can be turned relative to the threaded opening 23 by inserting a screwdriver tip or similar screw-turning implement through the access opening 39 of the cover plate 18. In fact, by turning the leveling screw 19, the entire sub-assembly (cover plate 18 and C-shaped channels 17) can be elevated above the horizontal flange 22 of the U-shaped channel 16 as shown in FIGURE 3. The length of the vertical leg 28 permits vertical adjustment of about one-half inch without introducing any gap between the C-shaped channel 17 and the horizontal flange 22 of the U-shaped channel 16. Where greater vertical adjustment (greater than the length of the vertical leg 28) is desired, a sleeper channel 40 may be provided as will hereinafter be described to cover the distance between the vertical leg 28 and the horizontal flange 22 to prevent the concrete 14 from entering into the interior of the electrical trench.

A decorative floor covering 15 (FIGURE 3) covers the access openings 39 and the fastening screws 38 of the cover plates 18. By the vertical adjustment provided with the present invention, the upper end of the vertical leg 27 is aligned horizontally with the flat upper surface of the resulting building floor, regardless of the sag or deflection of the U-shaped channel 16. As shown in FIGURE 3, a relatively thin decorative floor covering 15 is accommodated above the cover plate 18. Frequently the nature of the decorative floor covering is not known at the time a building is under construction. Floor coverings usually are available in two standard thicknesses (one-eighth inch and three-sixteenths inch). The present electrical trench is adapted to accommodate two different floor covering thicknesses.

By referring to FIGURE 6, it will be observed that there are outwardly extended horizontal lips 41, 42 associated with the vertical flanges 27, 28 respectively. The outwardly extended horizontal lip 41 is displaced from the end of the vertical flange 27 by one-eighth inch in one specific embodiment of this invention. In the same embodiment, the outwardly extended horizontal lip 42 is displaced from the end of the vertical flange 28 by three-sixteenths inch. The lengths of the vertical flange 27, 28 are identical. Hence, except for the different positions of the outwardly extended horizontal lips 41, 42, the entire C-shaped channel 17 possesses symmetry about a horizontal plane drawn centrally through the vertical web 24. The clearance holes 30 and the threaded holes 34 correspond in both of the horizontal legs 25, 26. Hence the C-shaped channel 17 can be overturned and reinserted in the trench assembly.

The function of the outwardly extended horizontal lips 41, 42 is to provide a shoulder along the screed line of the concrete fill 14. The alignment of the horizontal lip 41 with the upper surface of the concrete 14 can be clearly seen in FIGURE 2 which illustrates the present trench prior to affixiation of the decorative floor covering 15. When a floor covering 15' of greater thickness is utilized (FIGURE 4), the C-shaped channel 17 is overturned whereby the outwardly extended horizontal lip 42 is upwardly presented. The terminal portion of the vertical flange 28 now extends three-sixteenths inch above the screed line of the concrete 14 to accommodate a thicker decorative floor covering.

In order that the same decorative floor covering may be applied to the cover plates 18, it will be observed that the access openings 39 are provided with a recessed well 43 which is one-sixteenth inch deep in the described embodiment. At the time the C-shaped channels 17 are overturned, the cover plates 18 likewise are overturned so that the head portion 32 of the leveling screws 19 enters into the recessed well 43. Hence the upper surface of the cover plates 18 likewise will be three-sixteenths inch below the level of the upper end of the vertical flange 28 as seen in FIGURE 4. FIGURES 3 and 4 should be compared to observe the similarities and differences in arrangements resulting from accommodating a relatively thin decorative floor covering 15 (FIGURE 3) and a relatively thick floor covering 15' (FIGURE 4).

By inspection of FIGURE 2, it will be observed that the C-shaped channel 17 may be elevated (through turning of the leveling screws 19) through the distance of the vertical flange 28 before any gap occurs between the vertical flange 28 and the horizontal flange 22. Normally the length of the vertical flange 28 will be sufficient to accommodate any normal sag or deflection encountered in typical building construction. Where, however, the sag or deflection exceeds the length of the vertical flange 28, a sleeper channel 40 may be applied conveniently to enclose the gap between the vertical flange 28 and the horizontal flange 22.

A sleeper channel 40, illustrated in FIGURE 5, has a hook-shaped configuration including a flat horizontal upper surface 45, a connected vertical surface 46, a connected re-entrant horizontal surface 47 and a connected vertical depending surface 48. The sleeper channel 40 is substantially imperforate. The horizontal upper surface 45 has spaced L-shaped notches 49 along its edge. The notches 49 are spaced to correspond to the spacing of the clearance openings 30 of the C-shaped channel 17. Hence the L-shaped notches 49 can engage the leveling screws 19 of an assembled electrical trench. The width of the flat horizontal upper surface 45 is not greater than the additive length of the horizontal lip 42 and the horizontal leg 26. The height of the vertical surface 46 corresponds to the length of the vertical flange 28 (or 27). The width of the re-entrant horizontal surface 47 corresponds to the additive length of the horizontal lip 42 and the thickness of the vertical flange 28. Thus the sleeper channel 40 tightly fits over the lower portion of the C-shaped channel 17 and has its vertical depending surface 48 forming a coplanar extension of the inner surface of the vertical flange 28. Thus the vertical depending surface 48 abuts the horizontal flange 22 and serves as a barrier to prevent entry of wet poured concrete into the interior of the present electrical trench in those areas where greater vertical adjustment is required than is provided by the vertical flanges 28 over their height. The use of the sleeper channel 40 is clearly illustrated in FIGURE 3.

An alternative embodiment of the longitudinal channel is illustrated in FIGURE 7 and identified generally by the numeral 17'. As shown in FIGURE 7, the channel 17' has a horizontal body portion 50 with an inner face 51. Vertical flanges 27', 28' correspond with the vertical flanges 27, 28 of the channel 17 of FIGURE 6. Outwardly extended horizontal lips 41', 42' correspond with the outwardly extended horizontal lips 41, 42 of the channel 17 of FIGURE 6. The horizontal body portion 50 serves functions similar to those of the vertical web 24 and horizontal legs 25, 26 of the preferred embodiment of the channel 17.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. An electrical trench comprising a generally U-shaped channel having a horizontal web, upright legs and an outward horizontal flange at the upper end of each of said upright legs,
   a plurality of spaced threaded first openings in said horizontal flange,
   a linear C-shaped channel associated with each said outward horizontal flange comprising a vertical web, parallel horizontal legs, a vertical outward flange at the end of each of said horizontal legs, a plurality of spaced aligned openings in the said horizontal legs corresponding with the said threaded first openings of the said horizontal flange,
   a plurality of spaced aligned threaded second openings in said horizontal legs,
   said linear channel being positioned with one of said horizontal legs overlying a said outward horizontal flange of said U-shaped channel and the said vertical web inwardly presented,
   a plurality of leveling screws each having a threaded body and a head, said leveling screws having their said threaded body extended through said spaced aligned openings and threadedly engaged in said spaced threaded first openings with the said head above said horizontal legs,
   generally rectangular cover plates resting upon the heads of said leveling screws and further extending between the upper ones of said vertical outward flanges in covering relation to the said horizontal web, a plurality of spaced access apertures in each of said cover plates corresponding with the said leveling screws to receive a screw-turning implement in turning relation with the heads of said leveling screws,
   a plurality of second apertures in said cover plates corresponding with the said second threaded openings, and
   fastening screws having a head and a threaded body, the said threaded body extending through the said second aperture and being threadely engaged in the said threaded second openings.

2. The electrical trench of claim 1 wherein the said linear C-shaped channels have a horizontally outwardly extended lip on each of the said vertical flanges, the said lip of one vertical flange being displaced from the end of its flange by a greater distance than the said lip of the other vertical flange is displaced from the end of its flange.

3. The electrical trench of claim 2 wherein the said linear C-shaped channel is symmetrical about a horizontal plane through the center of the said vertical web except for the said horizontally outward lips.

4. The electrical trench of claim 2 wherein the said access apertures of the said cover plate have a recessed well extending from one surface of the said cover plates to receive the said head of the said leveling screws.

5. The electrical trench of claim 1 wherein said leveling screws are threadedly engaged in the said threaded first openings in their lower portion whereby the said C-shaped channel is elevated entirely above the said outward horizontal flanges and a sleeper channel is engaged in outboard relation with said C-shaped channel, said sleeper channel having a lowermost vertical depending surface which is coplanar with the inner surface of the said vertical flange of the said C-shaped channel and further is in abutment with the outer edge of said outward horizontal flanges.

6. The electrical trench of claim 5 wherein the said sleeper channel has a horizontal upper surface resting upon the lower one of said horizontal legs of said C-shaped channel, the said horizontal upper surface having spaced L-shaped notches which receive the said threaded portion of the said leveling screws.

7. An electrical trench comprising a generally U-shaped channel having a horizontal web, upright legs and an outward horizontal flange at the upper end of each of said upright legs,
   a plurality of spaced threaded first openings in said horizontal flange,
   a linear channel associated with each said outward horizontal flange comprising a body portion, a pair of vertical flanges extending oppositely from one end of said body portion, a horizontally outwardly extended lip adjacent to the end of each of said vertical flanges, a plurality of spaced aligned openings in the said body portion corresponding with the said threaded first openings of the said horizontal flange,
   a plurality of spaced aligned threaded second openings in the said body portion,
   said linear channel being positioned with said body portion overlying a said outward horizontal flange of the said U-shaped channel and the said vertical legs outwardly presented,
   a plurality of leveling screws each having a threaded body and a head, said leveling screws having their threaded body extended through said spaced aligned openings and threadedly engaged in said spaced threaded first openings with the said head above the said body portion,
   generally rectangular cover plates resting upon the heads of said leveling screws and further extending between the upper ones of the said vertical outward flanges in covering relation to the said horizontal web, a plurality of spaced access apertures in each of said cover plates corresponding with the said leveling screws to receive a screw-turning implement in turning relation with the heads of said leveling screws, a plurality of second apertures in said cover plates corresponding with the said second threaded openings, fastening screws having a head and a threaded body, the said threaded body extending through the said second aperture and being threadedly engaged in said threaded second openings.

References Cited in the file of this patent

UNITED STATES PATENTS

| | | |
|---|---|---|
| 2,445,197 | Wiesmann | July 13, 1948 |
| 2,489,477 | Brecher | Nov. 29, 1949 |
| 2,824,578 | Blinn et al. | Feb. 25, 1958 |
| 2,931,533 | Wiesmann | Apr. 5, 1960 |
| 3,025,884 | Johnson | Mar. 20, 1962 |

FOREIGN PATENTS

| | | |
|---|---|---|
| 471,845 | Canada | Mar. 6, 1951 |
| 524,218 | Canada | Apr. 24, 1956 |